United States Patent [19]

Kolvites et al.

[11] Patent Number: 5,269,208
[45] Date of Patent: Dec. 14, 1993

[54] TAMPER-PROOF FASTENER AND A DRIVER TOOL THEREFOR

[75] Inventors: Albert Kolvites, Mountaintop; Robert J. Cohn, Dallas, both of Pa.

[73] Assignee: James D. Sperling, Inkerman-Pittston, Pa.

[21] Appl. No.: 929,385

[22] Filed: Aug. 14, 1992

[51] Int. Cl.$^5$ .............................. B25B 13/48
[52] U.S. Cl. ...................... 81/176.2; 81/461; 81/121.1; 411/188; 411/910; 411/919
[58] Field of Search ............... 81/121.1, 124.2, 176.1, 81/176.15, 176.2, 441, 461; 411/187, 188, 402, 405, 910, 919, 959

[56] References Cited

U.S. PATENT DOCUMENTS

| | | | |
|---|---|---|---|
| 101,207 | 3/1870 | Apgar | 411/919 |
| 1,397,876 | 11/1921 | Meldal | 411/919 |
| 2,372,269 | 3/1945 | Golan | 81/121.1 |
| 3,897,712 | 8/1975 | Black | 411/959 |
| 3,935,877 | 2/1976 | Franceschi | 411/910 |
| 4,171,662 | 10/1979 | Simone et al. | 85/45 |
| 4,812,095 | 3/1989 | Piacenti et al. | 411/959 |
| 4,938,108 | 7/1990 | Mekler | 81/461 |

*Primary Examiner*—James G. Smith
*Attorney, Agent, or Firm*—Michael Ebert

[57] ABSTRACT

A tamper-proof fastener provided with a threaded shank and a low-profile drive head integral therewith. The drive head has a generally frusto-conical shape defining a circular flat top and a circular base of larger diameter, three short noses separated 120 degrees apart projecting from the sloped side of the drive head. The fastener is installed in a substrate or withdrawn therefrom by means of a tool having a driver head provided with a complementary frusto-conical socket to accommodate the drive head of the fastener, the wall of the socket having recesses therein to receive the noses of the head whereby a torque may be applied thereto.

7 Claims, 1 Drawing Sheet

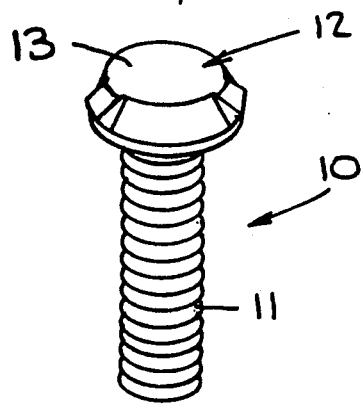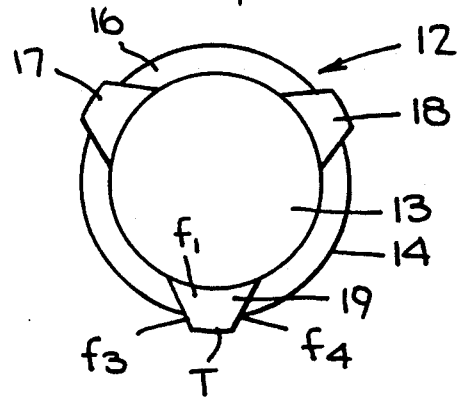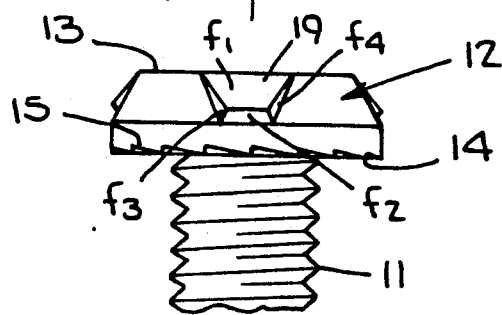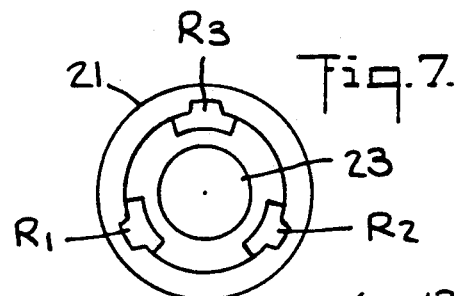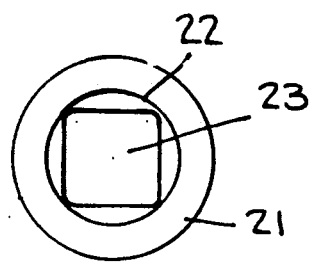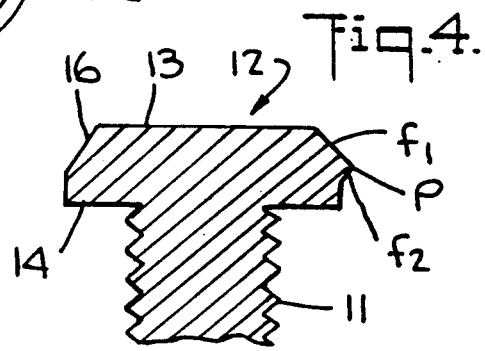

TAMPER-PROOF FASTENER AND A DRIVER TOOL THEREFOR

BACKGROUND OF INVENTION

1. Field of Invention

This invention relates generally to a bolt or screw-type threaded fastener having a drive head engageable by the driver head of a torque-producing tool, and more particularly to a security fastener having a tamper-proof drive head that is engageable only by a tool having a complementary driver head.

2. Status of Prior Art

The conventional fastener of the bolt or screw-type has a drive head that is so slotted that it can be driven by an ordinary screwdriver. Or the drive head may include a cruciform recess so that it can be driven by a Phillips driver.

With fasteners having conventional slotted drive heads, there is a marked tendency to cam out or to deform the head, mainly because of the relatively insecure coupling between the drive head of the fastener and the driver tool. Damage to the drive head is more likely to occur as the torque applied by the tool increases.

Moreover, many different tools may readily be fitted into a conventional slotted type of fastener drive head. Hence such fasteners are not resistant to unauthorized removal. While a Phillips arrangement offers somewhat greater security, the general availability of Phillips-type driver tools renders the Phillips arrangement unsuitable for tamper-proof or tamper-resistant applications. And where the head of the fastener has a large profile, it may be possible to remove the fastener by engaging the head with the parallel jaws of a gripping tool.

The prior art discloses various forms of tamper-proof fasteners which require special driver tools.

Thus the Bisbing et al. Pat. No. 4,258,596 shows a tamper-resistant fastener whose drive head is provided with three female sockets, at least one of which is eccentrically disposed with respect to the other two. This fastener may be installed or removed only by means of a special driver tool having a male head adapted to be received in the female sockets of the fastener head to permit turning of the fastener upon application of torque to the driver tool.

There are many situations, such as in toilet stalls, where it is essential that fastener heads be maintained in a clean and sanitary condition, and yet be resistant to unauthorized removal. Because of the recessed female sockets in the head of the Bisbing et al. fastener, this head tends to collect contaminants and is not easy to clean.

The Goldhaber Pat. No. 4,018,111 discloses a tamper-resistant threaded fastener whose drive head has a bore therein which is eccentrically disposed relative to the longitudinal axis of the shank of the fastener. The drive tool for this fastener has a key which enters the bore of the fastener head. This provides a relatively weak coupling between the tool and the fastener head.

The Herkes et al. Pat. No. 4,125,051 discloses a tamper-proof fastener having a low profile head designed to resist unauthorized removal, the upper surface of the head being configured to include a short cylindrical boss and ribs radially extending from this boss.

In the Simone et al. Pat. No. 4,171,662, a security screw is disclosed whose head is shaped to prevent its removal except by the use of a matching socket wrench.

The Rodseth Pat. No. 4,430,035 shows a ribbed drive head for a fastener and a mating driver tool having a driver head or socket which complements the fastener drive head for closely interfitting engagement therewith.

Of particular background interest is the Mekler Pat. No. 4,938,108, issued in 1990, for this patent contains a detailed account of prior U.S. and foreign patents which disclose various expedients to render threaded fasteners tamper-proof or theft-resistant.

SUMMARY OF INVENTION

The main object of this invention is to provide a tamper-proof fastener and a driver tool therefor adapted to engage the drive head of the fastener to facilitate the installation of a fastener in a substrate or its removal therefrom, and in the process of doing so, inflicting no damage on the fastener.

More particularly, an object of the invention is to provide a fastener of the above type whose drive head is free of recesses or cavities whereby it may be maintained in a clean and sanitary condition. Thus the fastener is suitable for installation in toilet stalls and in other structures where sanitation as well as a presentable appearance are essential requirements.

Also an object of the invention is to provide a tamper-proof fastener having a low-profile drive head so configured that the fastener can be removed only by a torque-producing tool whose driver head has a matching configuration, the drive head of the fastener being resistant to engagement by the parallel jaws of a gripping tool or by any tool other than one specially adapted to engage the drive head.

Yet another object of the invention is to provide a tamper-proof or security fastener whose shaped drive head is formable by cold heading; hence without heat softening the head and impairing the strength of the fastener.

Briefly stated these objects are attained in a tamper-proof fastener provided with a threaded shank and a low-profile drive head integral therewith. The drive head has a generally frusto-conical shape defining a circular flat top and a circular base of larger diameter, three short noses separated 120 degrees apart projecting from the sloped side of the drive head. The fastener is installed in a substrate or withdrawn therefrom by means of a tool having a driver head provided with a complementary frusto-conical socket adapted to accommodate the drive head of the fastener, the wall of the socket having recesses therein to receive the noses of the head whereby a torque may be applied thereto.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a perspective view of a tamper-proof fastener in accordance with the invention;

FIG. 2 is a top view of the drive head of the fastener;

FIG. 3 is a side view of the drive head;

FIG. 4 is a section taken through the head;

FIG. 5 is a sectional view of the driver head of a torque-producing for driving the fastener;

FIG. 6 shows the rear end of the driver head; and

FIG. 7 shows the front end of the driver head.

DESCRIPTION OF INVENTION

Referring now to FIGS. 1 to 4, there is shown a tamper-proof threaded fastener in accordance with the invention, generally identified by reference numeral 10. The fastener is constituted by an externally-threaded shank 11 and an enlarged drive head 12 integral therewith. The fastener may be fabricated from a rod of stainless steel or other suitable metal, head 12 being preferably formed by cold working. In this way, the metal is not heated to render it moldable so that it can be formed, for such heating may impair the strength of the metal.

Head 12, which has a low profile, is in a generally frusto-conical form defining a circular, flat top 13, a circular flat base 14 of larger diameter, and a sloped side 16 extending from top 13 to base 14. To ensure frictional engagement between the base of the drive head and the surface of the substrate in which the fastener is installed so as to resist turning out of the fastener as a result of vibrating forces, the undersurface of base 14 is preferably provided with a ring 15 of small serrations.

Projecting outwardly from sloped side 16 of head 12 are three short noses 17, 18 and 19 separated 120 degrees from each other. As best seen in FIG. 3, each nose is formed by an upper facet $F_1$ having a trapezoidal form, a lower trapezoidal facet $F_2$ of smaller size, and triangular left and right facets $F_3$ and $F_4$ which together create a straight line peak P. The projection of the nose is such that peak P lies slightly beyond base 14 of the drive head.

Head 12 is free of recesses or cavities and may therefore be cleaned or polished over its entire surface, so that the head presents an attractive appearance and is sanitary.

A torque-producing tool, which is specially adapted to engage drive head 12 of the fastener, is provided. This tool, as shown in FIGS. 5 to 7, includes a driver head, generally identified by reference numeral 20 having a cylindrical front collar section 21 and a cylindrical shank section 22 of reduced diameter.

Shank section 22 of the driver head is provided with a bore 23 having a square cross section adapted to receive a bit 24 having the same square section. Bit 24 is held in a tool, which in practice may be motor or hand driven.

Collar section 21 has a socket formed therein. This socket has a frusto-conical form which complements the form of the drive head of the fastener, so that drive head 12 fits neatly within the socket. The wall of collar section 21 surrounding the socket therein is provided with internal recesses $R_1$, $R_2$ and $R_3$. These recesses, which are 120 degrees apart, are adapted to receive noses 17, 18 and 19 of the drive head of the fastener.

As best seen in FIG. 5, each recess $R_1$ in the driver head leads to an undercut cavity $C_1$ having a greater width, so that the nose can then be moved away from the inlet to the cavity. Hence when the other noses of the drive head of the screw-type fastener enter the cavities in the drive head, a slight turn of the driver head relative to the drive head of the fastener acts to trap the nose within the cavity, as in a bayonet coupling.

This bayonet coupling prevents disengagement of the driver from the tamper-proof fastener under a torque load which often happens with conventional screws having slotted heads and screw drivers. Moreover an installer can insert the drive head of a fastener into the driver head to effect a coupling therebetween before turning in the fastener. This feature is helpful when the installer is working in tight places.

Some prior types of anti-tamper fasteners require a simple driver tool to install the fastener and a more complicated tool to remove it. With the present invention, the same driver is used both for installation and removal of the tamper-proof fastener.

Thus there is no way by which drive head 12 of the fastener can be engaged by a tool other than the driver tool specially designed for this purpose. There are no slots or recesses in this head that will accept an ordinary screwdriver or a Phillips type driver. And a conventional socket wrench cannot be used, for there is nothing on the drive head that can be effectively gripped by this wrench. Nor can one use pliers or any other tool having jaws to engage the low profile head, for there is nothing on the head that can be gripped by cooperating jaws.

Hence the fastener is tamper-proof and cannot be installed or withdrawn by unauthorized personnel unless they obtain access to the special tool capable of doing so.

While there has been shown and described a preferred embodiment of a tamper-proof fastener and a driver tool therefor in accordance with the invention, it will be appreciated that many changes and modifications may be made therein without, however, departing from the essential spirit thereof.

We claim:

1. A tamper-proof fastener in combination with a tool comprising:
    A. a fastener having a threaded shank; and an enlarged drive head integral with the shank, said drive head having a generally frusto-conical shape defining a circular flat top, a circular base of larger diameter, a sloped annular side, and at least one short nose having angled facets projecting from the sloped side, said nose being formed by an upper trapezoidal facet that is outwardly inclined relative to the top, a lower trapezoidal facet of smaller size that is outwardly inclined relative to the base and is joined to the upper facet at a straight line forming a peak, and left and right triangular facets flanking the upper and lower facets, the apex of each triangular facet joining the straight line; and
    B. a torque-producing tool for the fastener whereby the drive head can be engaged only by the tool, said tool having a driver head provided with a socket having a frusto-conical shape that matches the shape of the drive head and includes a recess that receives the nose so that the drive head nests within the socket.

2. A fastener as set forth in claim 1, including three noses projecting from the sloped side and separated 120 degrees from each other.

3. A fastener as set forth in claim 2, wherein said drive head has a low profile, and said noses do not extend substantially beyond said base.

4. A fastener as set forth in claim 1, wherein said base has an undersurface that is serrated to enhance frictional contact between said base and a substrate in which the fastener is installed.

5. A fastener as set forth in claim 1, wherein said fastener is fabricated of stainless steel, and said drive head is cold headed.

6. A tool as set forth in claim 1, wherein said driver head includes a shank section have a bore therein adapted to snugly receive a bit having a square cross section.

7. A tool as set forth in claim 1, wherein said socket recess leads into a cavity of greater width than the nose so that the nose received in the recess may be displaced in the cavity relative to the recess to provide a bayonet coupling between the driver head and the drive head of the fastener.

* * * * *